United States Patent [19]

Gershberg

[11] 4,035,317

[45] July 12, 1977

[54] RAPIDLY DISSOLVING, WATER-SOLUBLE POLYMERS AND SPRAY DRYING METHOD FOR THEIR PRODUCTION

[75] Inventor: David Benedict Gershberg, Stamford, Conn.

[73] Assignee: American Cyanamid Company, Stamford, Conn.

[21] Appl. No.: 591,909

[22] Filed: June 30, 1975

[51] Int. Cl.² ........................................ C08J 9/00
[52] U.S. Cl. ..................... 260/2.5 N; 260/2.5 B; 260/2.5 H; 260/2.5 L; 264/13
[58] Field of Search .......... 260/2.5 B, 2.5 N, 2.5 L, 260/2.5 H, 29.6; 264/13

[56] References Cited

U.S. PATENT DOCUMENTS

| 2,202,481 | 5/1940 | Cox et al. ............................. 264/13 |
| 3,172,867 | 3/1965 | Showalter ....................... 260/2.5 B |
| 3,826,771 | 7/1974 | Anderson et al. ............ 260/29.6 H |
| 3,896,196 | 7/1975 | Dickey et al. ....................... 264/13 |
| Re. 27,444 | 7/1972 | Zimmerstrasse .............. 260/29.2 N |

FOREIGN PATENT DOCUMENTS 905,779   9/1962   United Kingdom .............. 260/29.6

*Primary Examiner*—J. Ziegler
*Attorney, Agent, or Firm*—Frank M. Van Riet

[57] ABSTRACT

A free-flowing particle mixture of a water-soluble polymer wherein the particles are (1) no smaller than about 325 mesh, (2) at least 50% thereof are larger than about 120 mesh and (3) none are larger than about 20 mesh, said mixture containing no more than about 12% volatiles and said particles comprising hollow, porous structures having at least one opening in their walls, the walls comprising small adhering aggregates of the same compositions and a method for producing such a mixture comprising spraying a water-in-oil emulsion of said polymer, using a specific type and orifice-size nozzle, into a gas stream at an outlet gas temperature of at least about 212° F. and at a dryer residence time of at least about 40 seconds.

25 Claims, 4 Drawing Figures

RAPIDLY DISSOLVING, WATER-SOLUBLE POLYMERS AND SPRAY DRYING METHOD FOR THEIR PRODUCTION

BACKGROUND OF THE INVENTION

The production of high molecular weight, water-soluble polymers from such monomers as acrylamide has materially increased over the past decade. These polymeric materials find use as flocculants for mining operations to recover ore from slurries, water-treating to remove suspended impurities etc., and also are used extensively in paper-making to aid paper formation and in oil recovery industries. In the production of these polymers by polymerization of their monomers, it has become increasingly important to produce as high a molecular weight polymer as possible because such polymers function more efficiently than lower molecular weight polymers. It has also been evident that the production of such polymers utilizing a higher monomer solids reaction media would enable the production of more useful polymers at a more economical rate.

One major problem in the production of these water-soluble polymers, especially those of acrylamide, has been recovery of the polymer in a dry condition. When producing these polymers, they eventually go through a stage in the processing when they are in the condition of very stiff aqueous gels. Since the solubility of the polymers in water is one of the most important concerns of the ultimate consumer, it has become increasingly important to produce these polymers in such a condition that they dissolve in water as rapidly as possible.

In 1966, Terenzi patented a process, see U.S. Pat. No. 3,255,142, where the polymer gel was extruded into a rapidly flowing stream of liquid in order to break it into particles of gel which would dissolve more easily than larger sections thereof.

In U.S. Pat. Nos. 3,766,120 and 3,714,136 I disclose another process for rendering polymer gels more easily dissolved wherein the gel is cut into fragments of about ⅛ at low temperatures and dried by suspending them in air. Sodium sulfate powdered on the gel particles renders them freeflowing.

None of these procedures, however, has completely solved the problem of easily dissolving particles of high molecular weight water-soluble particles in water. Attempts to grind or crush dried polymer fragments into small particles also has not accomplished this because the particles are mostly non porous. Excessive shearing and grinding also degrade the polymer.

The advent of a process for the production of emulsions of water-soluble polymers by polymerizing the monomers utilizing a water-in-oil emulsifier appeared to be a solution to the dissolution problem. U.S. Pat. Nos. 3,284,393 and 3,826,771 and British Pat. No. 905,779, all of which are hereby incorporated herein by reference, all teach procedures of this type whereby water, a hydrocarbon oil, the water-soluble monomer and an appropriate emulsifier are formed into a water-in-oil emulsion and polymerization of the monomer is then effected in the presence of a suitable catalyst and at 0°–70° C. The attractiveness of the new procedure resided in the fact that the resultant polymer did not have to be recovered therefrom. The polymerization resulted in the formation of a water-in-oil emulsion of the polymer and said emulsion per se could then be used as such for most of the applications mentioned above.

Two problems still existed, however. In the first place, the cost of transporting the emulsion is materially higher than if the polymer per se were being transported. Since the emulsions contain, on the average, only about 25–30% polymer, 70–75% of the material shipped is useless oil and water. Secondly, the emulsions can present a stability problem when exposed to temperatures below their freezing point.

It has therefore now become even more evident that a system for the recovery and isolation of a high molecular weight, rapidly dissolving, water-soluble polymer is needed. This need has been satisfied by my novel invention disclosed hereinbelow.

SUMMARY OF THE INVENTION

I have now discovered that water-in-oil emulsions of water-soluble polymers can be recovered as a mixture of finely divided polymer particles which flow freely, are nondusting and dissolve rapidly and do not clump when added to water. The polymer particles have a unique structure and the particle mixture comprises particles of a specific minimum size. The particle mixtures dissolve 3–12 times faster than those dry particles made by current commercial technology. Additionally, my novel process results in polymers which are degraded to a lesser extent that polymers produced and recovered by the above-mentioned commercial procedures which thereby enables the production of higher molecular weight materials.

My novel process, disclosed more fully hereinbelow, results in a more rapidly dissolving dry polymer, as mentioned above. Polyacrylamide, for example, is used as an emulsion because, in emulsion form, it dissolves in water much faster than previously known dry polyacrylamides, i.e., 15 minutes as compared to 1½ – 3 hours. My polymer particle mixtures of polyacrylamide, however, dissolve in water in 15–30 minutes, a feature which appears to be due to their novel structure. Unlike the usual non-porous dry polyacrylamide, my products have porous structures which allow easy, rapid access of the aqueous solution to a very large surface area of the particle.

DESCRIPTION OF THE INVENTION INCLUDING PREFERRED EMBODIMENTS

Figure 1:
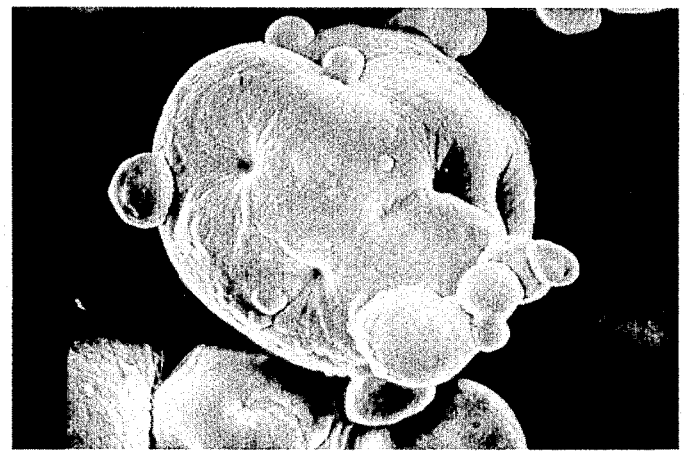
FIG. 1 is a photomicrograph of a single particle of polyacrylamide produced according to the instant process and enlarged 200 times. The photo vividly shows the large hole present in the particle caused by the rapid expulsion of water vapor from the hollow interior, thereof.
Figure 2:
FIG. 2 is a photomicrograph of a single polyacrylamide particle of the instant invention which has been cleaved and enlarged 300 times. This photo clearly shows the hollow, spherical features of the interior of the particle.
Figure 3:
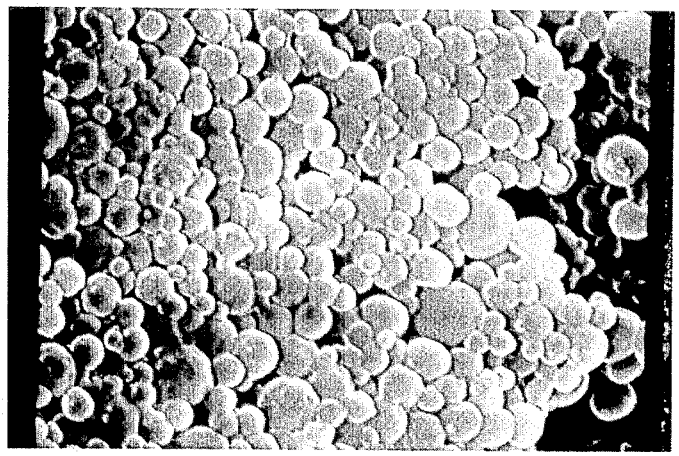
FIG. 3 is a photomicrograph of the wall of the particle of FIG. 2, above, enlarged 10,000 times. The configuration of the wall is clearly depicted as agglomerated particles of polyacrylamide, believed to be the original polymer particles in the emulsion charge.
Figure 4:
FIG. 4 is a photomicrograph of a section of polyacrylamide produced by a typical commercial polymerization process, the polymer having been recovered by belt drying and ground to size. The enlargement is 10,000 times and the photo shows a solid non-porous structure.

The references cited hereinabove teach the production of water-in-oil emulsions of water-soluble polymers by preparing a water-in-oil emulsion of the monomer and polymerizing it in the presence of a suitable catalyst. The earliest patent, i.e., British Pat. No. 905,779, also teaches that a plurality of techniques may be used to isolate the resultant polymer from the emulsion. Isolation techniques disclosed include precipitation, azeotropic distillation, spray drying and drum drying. These techniques are all treated as equivalent and are said to produce a dry, granular polymer with the stabilizer coating the granules and giving them especially good dissolution characteristics.

U.S. Pat. No. 3,284,393 teaches the production of water-in-oil emulsions of polymer in accordance with British disclosure and recovers the resultant polymer by flocculation and filtration. The polymer is said to exist as particles ranging from 150 Angstroms to 4 microns in size.

In U.S. Pat. No. 3,826,771, the polymer is formed in a water-in-oil emulsion and is not recovered. The patentees indicate, however, that the particle size thereof ranges from about 2 millimicrons to about 5 microns.

I have now found that water-in-oil emulsions of water-soluble polymers can be spray-dried under certain critical conditions so as to produce a novel polymer product which is non-dusting, dissolves in water 3–12 times more rapidly than other dry polymer, does not clump when added to water and is of high molecular weight. These polymers are produced as mixtures of particles having a size no smaller than about 325 mesh. As shown in the accompanying drawings, the novel, free flowing, particle mixtures of water-soluble polymer produced according to my invention are composed of particles no smaller than about 325 mesh. At least 50% of the mixture, by weight, based on the total weight of the particles, have a size larger than about 120 mesh while substantially none of the particles are larger than about 20 mesh. The mixture furthermore contains no more than about 12% of total volatiles, same basis. The particles themselves are highly porous, hollow and have at least one opening in their walls. The opening can constitute a pathway between the aggregates in the wall or can comprise relatively large openings probably formed by expulsion of gas from the center thereof during their formation. Their walls as stated above are composed of small, adhering aggregates of the same polymer composition.

The drawings clearly show that the instant particle mixture is composed of substantially spherical particles. Furthermore, the particle walls are made up of smaller aggregates which appear to be of substantially the same size as the polymer particles contained in the emulsion charge.

Example 18, below, shows that very fine sized particles, e.g., of smaller than about 325 mesh, do not readily dissolve in water to the extent that they may be used in place of the water-in-oil emulsions of the polymers per se. Indeed, I have discovered that if the spray-drying of the emulsion is not conducted under the critical conditions specified hereinbelow, very fine particles may result, which particles do not dissolve in sufficiently short periods of time to enable them to be commercially attractive for most industrial applications.

In accordance with my novel process, a water-soluble polymer particle mixture is recovered from a water-in-oil emulsion comprising
a. from about 30–90%, preferably 60–80%, by weight, based on the total weight of the emulsion, of an aqueous phase comprised of
1. from about 10–50%, preferably 20–40%, by weight, same basis, of finely-divided particles of a water-soluble, vinyl, addition polymer and
2. from about 10–80%, preferably 35–55%, by weight, same basis, of water,
b. from about 10–70%, preferably 20–40%, by weight, same basis, of a liquid hydrocarbon oil and
c. from about 0.1–10%, preferably 2.0–5.0%, by weight, same basis, of a water-in-oil emulsifying agent, said weight of emulsifying agent replacing an equivalent portion of either the water or the oil or both, by spraying said emulsion through one or more pressure nozzles having an orifice size of from about 0.01 to about 0.2 inch, preferably about 0.05 to about 0.150 inch, into a gas stream at an apparatus outlet gas temperature of from about 212° F. to below about the initial decomposition-temperature of the water-soluble, vinyl, addition polymer at a ratio of gas feed rate to emulsion feed rate of from about 2 to about 80 pounds of gas per minute per pound of emulsion per minute, preferably from about 5 pounds to about 20 pounds of gas per minute per pound of emulsion per minute, and at a nominal dryer residence time of from about 40 seconds to about 180 seconds, preferably about 60 seconds to about 120 seconds, wherein "nominal residence time" is defined as the dryer volume divided by the volumetric gas rate. The volumetric gas rate is defined as that quantity of gas which flows through the drier in cubic feet per second.

The pressure under which the emulsion charge is distributed through the specific nozzle employed depends upon that nozzle and should be such that the droplets of emulsion produced thereby enables the recovery of polymer particles of the size set forth hereinabove.

By drying the emulsion under these conditions, the above-describedpolymer particle mixture is recovered. If conditions outside these ranges are employed, the polymer produced is either too fine in its particle size, which causes it to clump in aqueous solution and dissolve with difficulty, or too large, which causes it to wet out on the drier walls, dry insufficiently and dissolve with difficulty. Additionally, the polymer may be degraded in quality, i.e., it may decompose either by reduction of its molecular weight or by the formation of water-insoluble polymer.

The water-in-oil emulsion charge can be preparedin any manner and still be useful in the process described herein. Any of the procedures for making such emulsions described in the prior art, and in particular, described in the references cited above, whether stable for long periods of time or not, can be used herein provided that the charge is an emulsion when used.

The polymers most useful as charge emulsions to my novel process are those produced from acrylamide, including polyacrylamide and those produced from comonomer mixtures of acrylamide and its water-soluble comonomer including sodium acrylate, acrylic acid, vinylbenzyl trimethylammonium chloride, methacrylic acid, acrylonitrile, dimethylaminoethylmethacrylate, (methacrylamido)propyltrimethylammonium chloride, and the like. These comonomers can be used singly or in conjuction with each other as copolymerization ingredients with acrylamide in amounts of up to about 95%, preferably from about 5% to about 50%, by weight, based on the total monomer weight, remainder acrylamide. These water-soluble polymers may be nonionic, cationic or anionic, see U.S. Pat. Nos. 3,418,237; 3,259,570; 3,171,805, incorporated herein by reference, and may have molecular weight of from about 10,000–25,000,000, preferably at least 1,000,000, as indicated from a measurement of the standard viscosity thereof in solution.

Examples of other water-soluble polymers which may be prepared as water-in-oil emulsions and used as charge materials to the process of the instant invention are polyacrylic acid, polymethacrylic acid, sodium polyacrylate, polyvinylbenzyl trimethylammonium chloride, poly(sodium-2-sulfoethylacrylate), polyvinylbenzyl sodium sulfonate, poly(sodium styrene sulfonate), polystyrene sulfonate, poly(dimethylaminoethyl methacrylate), poly[(methacrylamido)propyltrimethylammonium chloride], copolymers of the monomers from which the above homopolymers are prepared and the like.

The hydrocarbon oils useful herein include any organic hydrocarbon liquid, such as aliphatic hydrocarbons, aromatic hydrocarbons, mixtures of aliphatic and aromatic hydrocarbons etc. usually containing from 4–8 carbon atoms but including those of up to 12 carbon atoms. Thus I may use benzene, xylene, toluene, mineral oil fractions, kerosenes, naphthas, petroleum fractions and the like. Of preferred value is a material called ISOPAR M manufactured by Humble Oil and Refinery Company. This material is a narrowcut isoparaffinic oil described more fully in U.S. Pat. No. 3,826,771, above.

Useful water-in-oil emulsifiers are known in the art and include polyoxyethylene sorbitol hexaoleate, sorbitan monostearate, sorbitan monooleate, hexadecyl sodium phthalate, cetyl or stearyl sodium phthalate, metal soaps, sorbitan trioleate and other low HLB materials.

Under the conditions of drying set forth herein, the novel particulate mixture of the present invention contains less than about 12%, by weight, based on the total particle mixture weight, of volatiles, and preferably less than about 6%, by weight, same basis. The volatiles, of course, comprise oil and water remaining from the emulsion. Of the volatiles, most is water, there generally being no more than about 1.0% of oil present. The particle mixture also usually contains all or nearly all of the emulsifier contained in the emulsion charge. The molecular weight of the polymer before and after drying usually does not vary and, in general, the standard viscosity of the recovered polymer does not differ more than about 1.0 cps., usually less than about 0.6 cps. from that of the charged polymer.

The mesh size used to describe the polymer particles herein is the standard set forth in the U.S. sieve Series, ASTM E-11-61, adopted 1961, wherein mesh size 30 = 595$\mu$; mesh size 100 = 149$\mu$; mesh size 325 = 44$\mu$. As mentioned above, the mesh size of the particles in the mixtures claimed hereinbelow are no smaller than about 325 mesh and at least 50%, preferably at least 70%, thereof have a mesh size larger than about 120 mesh. The largest particle mesh size in the mixture is about 20 mesh i.e. 841$\mu$.

The above conditions, which are those which are critical with regard to the instant process, i.e., the nozzle type and orifice size, the gas stream outlet temperature, the polymer nominal residence time, and the gas to liquid charge ratio all function cooperatively to produce my novel polymer particle mixture. As mentioned, at least one nozzle of the specific orifice size shoud be used. However, it is also possible to use a plurality of said nozzles in order to accomplish a greater emulsion throughput during the drying. Practically, from 2–8 of nozzles can be employed as long as the orifice sizes thereof all fall within the designated range.

Gas flow can be counter-current or co-current with the emulsion spray, co-current flow being preferred.

The required inlet gas temperature is primarily a function of the critical outlet gas temperature, the vaporization load and heat losses in the dryer. In this regard, an inlet temperature ranging from about 450°–650° F. may be effective in a production size dryer, i.e., 20 ft. diameter; 40 ft. height.

The following examples are set forth for purposes of illustration only and are not to be construed as limitations on the present invention except as set forth in the appended claims. All parts and percentages are by weight unless otherwise specified.

In the following examples, the Polymer Standard Viscosity (as used to relate to the polymer molecular weight) and the Polymer Solution Time are measured according to the following techniques.

POLYMER STANDARD VISCOSITY

This measurement is the viscosity of a 0.096% solution of the water-soluble polymer in 1 N sodium choride at 25° C., at a pH of 8.0 for nonionic and anionic polymers and at a pH of 5.5 for cationic polymers. The viscosity is measured by a Brookfield LVT viscometer with a UL adapter at 60 rpm. The polymer solution being measured is made by preparing a 0.25% solution of polymer in deionized water during two hours, filtering out any undissolved polymer through 100 mesh stainless steel screen and then diluting with the appropriate amounts of deionized water and sodium chloride.

POLYMER SOLUTION TIME

This test is initiated by strirring 400 gms. of deionized water in each of several beakers. Dry polymer, sufficient to result in a 0.25% solution, is added to each beaker during 1–2 minutes. As various times, including 5, 10, 15, 30, 60, 90 and 120 minutes, the solution is filtered through 100 mesh stainless steel screen. The undissolved polymer remaining on the screen is dried and weighed and the percent polymer dissolved is calculated.

As an additional measure of polymer solution time, the filtered solutions are diluted with fixed amounts of water and sodium chloride to result in a 1 N sodium choride solution containing equal to or less than 0.096% polymer depending upon the amount of polymer which dissolved. The viscosity of these solutions are then measured as described immediately above. The polymer solution time is then designated as the earliest time at which the viscosity becomes essentially constant.

EXAMPLE 1

A polymer emulsion containing 25% of nonionic polyacryamide in theform of water-swollen particles (0.1–30$\mu$) is suspended in a commercially available hydrocarbon paraffin oil by means of sorbitan monooleate. The polymer has a polymer standard viscosity of 4.1 cps. indicative of a molecular weight of over 5,000,000.

The emulsion is sprayed into a co-currently traveling stream of heated air in a dryer 20 feet in diameter and 40 feet high. The nozzle orifice size, air rate, inlet air temperature and exit air temperature are set forth in Table I, below. The table also sets forth the volatile content and particle size of the resultant particle mixture as well as the Polymer Standard Viscosity thereof. The Polymer Solution Time is also specified.

EXAMPLES 2–4

The procedure of Example 1 is again followed except that various conditions are varied including the polymer composition. The results are also set forth in Table I below.

As can be seen from a careful consideration of Table I, my novel process enables the production of particles of water soluble polymers, which particles are of relatively large size so as to avoid clumping when added to water and yet are dried sufficiently to be free-flowing and do not wet out on the dryer walls. At the same time the very high molecular weight polymer which is known to be prone to thermal degradation is significantly unaffected both in molecular weight and in insolubles formation despite the relatively severe drying conditions required. The fact that all these results can be achieved simultaneously is truly unexpected.

TABLE I

SPRAY DRIED EMULSIONS

AIR RATE = 5600 cfm

| Ex. | Polymer Type | EMULSION Polymer Standard Viscosity (CPS) | Polymer Solids (%) | DRYER CONDITIONS Pressure Nozzle Orifice Size (In.) | Emulsion Feed Rate (GPH) | Air Temp. (°F) In | Out | Total[a] Volatiles (%) | (% of Particles) Oil (%) | DRY POLYMER Particle Size Viscosity (CPS) 30-100 Mesh | 145-325 Mesh | Polymer Standard Solution Value | Drying Loss | Polymer Time (Min.) |
|---|---|---|---|---|---|---|---|---|---|---|---|---|---|---|
| 1 | NONIONIC - (100% Polyacrylamide) | 4.1 | 25 | | | | | | | | | | | |
| a | | | | 0.099 | 37 | 600 | 278 | 6.0 | 0.6 | 74 | 26 | 3.5 | 0.6 | 15 |
| b | | | | " | 75 | 550 | 245 | 8.7 | — | 60 | 40 | 3.8 | 0.3 | — |
| c | | | | 0.125 | 92 | 600 | 275 | 6.9 | 0.1 | 70 | 30 | 3.7 | 0.4 | 15 |
| 2 | ANIONIC - Polyacrylamide hydrolyzed to 3% carboxyl content | 4.7 | 22 | | | | | | | | | | | |
| a | | | | 0.099 | 72 | 600 | 285 | 5.5 | 0.4 | 80 | 20 | 4.1 | 0.6 | 15 |
| 3 | ANIONIC - (70/30 Acrylamide/Acrylic Acid Copolymer) | 5.4 | 23 | | | | | | | | | | | |
| a | | | | 0.099 | 61 | 520 | 258 | 10.0 | — | 78 | 22 | 5.4 | 0.0 | — |
| b | | | | " | " | 560 | 270 | 7.8 | — | 70 | 30 | 5.4 | 0.0 | — |
| c | | | | " | 0.125 | 91 | 600 | 280 | 9.0 | — | 91 | 9 | 4.8 | 0.6 |
| d | | | | " | 122 | 600 | 265 | 9.8 | 0.2 | 84 | 16 | 5.4 | 0.0 | 30 |
| e | | | | " | 137 | 600 | 265 | 9.2 | — | 76 | 24 | 5.3 | 0.1 | — |
| 4 | CATIONIC (90/10 Acrylamide/DMAEMA[b] Copolymer) | 3.8 | 28 | 0.125 | 92 | 600 | 270 | 7.5 | 0.1 | 64 | 36 | 3.4 | 0.4 | 15 |

[a]Water plus oil.
[b]Dimethylaminoethylmethacrylate

EXAMPLE 5
(Comparative)

The procedure of Example 1 is again followed except that the exit air temperature is 200° F. and the inlet air temperature is 450° F. The resultant product particle mixture has a volatile content of 14% and contains large wet polymer particle agglomerates. A substantial amount of wet polymer build-up adheres to the walls of the drier.

EXAMPLES 6–17

Following the procedures of the example specified thereafter, the following polymers are spray dried from water-in-oil emulsions thereof. In each instance, results substantially equivalent to those specified in the procedural example are attained. The charge polymers are set forth in Table II, below

TABLE II

| Ex. | Polymer | Conditions of Ex. No. |
|---|---|---|
| 6 | Polysodium styrene sulfonate | 1c |
| 7 | Polyvinylbenzyl sodium sulfonate | 3c |
| 8 | Polyacrylic Acid | 3c |
| 9 | Polymethacrylic Acid | 2a |
| 10 | Polyvinylbenzyl tri-methylammonium chloride | 3d |
| 11 | Polydimethylaminoethyl methacrylate | 4a |
| 12 | Poly(sodium-2-sulfo-ethylacrylate) | 1b |
| 13 | Polystyrene sulfonate | 2a |
| 14 | Acrylamide-methacryl-amidopropyltri-methylammonium chloride (90/10) | 3d |
| 15 | Sodium acrylate-acrylamide (50/50) | 4a |
| 16 | Sodium polyacrylate | 1b |
| 17 | Acrylamide-dimethyl-aminopropyl methacrylate (85/15) | 3c |

EXAMPLE 18

The procedure of Example 1 is again followed except that the drying conditions are adjusted so as to produce polyacrylamide particles, the majority of which have a particle size smaller than about 325 mesh. Attempts to dissolve the particles in water according to the viscosity and solution time methods discussed above cause the formation of many large polymer clumps which do not dissolve even after two hours. Such an extended dissolution time renders the particles unsatisfactory for most commercial applications.

I claim:

1. A method of recovering a free-flowing, porous and hollow water-soluble, polymer particle mixture from (A) a water-in-oil emulsion comprising
   a. from about 30–90%, by weight, based on the total weight of the emulsion, of an aqueous phase comprised of
      1. from about 10–50%, by weight, same basis, of finely divided particles of a water-soluble vinyl addition polymer and
      2. from about 10–80%, by weight, same basis, of water,
   b. from about 10–70%, by weight, same basis, of a liquid hydrocarbon and
   c. from about 0.1–10%, by weight, same basis, of a water-in-oil emulsifying agent which comprises spraying said water-in-oil emulsion, through one or more pressure nozzles having an orifice size of from about 0.01 to about 0.2 inch, into a gas stream at an outlet gas temperature of from about 212° F. to about the decomposition temperature of the polymer at a ratio of gas drying rate to emulsion feed rate of from about 2 to about 80 pounds of gas per minute per pound of emulsion per minute and at a dryer residence time of from about 40 seconds to about 180 seconds and recovering the resultant, free-flowing, particle mixture, (1) the particles of said particle mixture having a size no smaller than about 325 mesh, (2) at least 50% thereof having a size larger than about 120 mesh and (3) none thereof having a size larger than about 20 mesh, said mixture containing no more than about 12% of total volatiles, said particles being highly porous, hollow and having at least one opening in their walls, said walls being composed of small adhering aggregates of the same polymer composition.

2. A method according to claim 1 wherein the molecular weight of said polymer is at least about 1,000,000.

3. A method according to claim 1 wherein the emulsion is sprayed into said gas stream co-currently therewith.

4. A method according to claim 1 wherein said gas is air.

5. A method according to claim 1 wherein said gas is nitrogen.

6. A method according to claim 1 wherein said polymer is a polymer of acrylamide.

7. A method according to claim 1 wherein said polymer is polyacrylamide.

8. A method according to claim 1 wherein said liquid hydrocarbon is a paraffin oil.

9. A method according to claim 1 wherein a plurality of pressure nozzles are employed.

10. A method according to claim 1 wherein said polymer nominal residence time ranges from about 60 seconds to about 120 seconds.

11. A method according to claim 1 wherein said polymer is anionic.

12. A method according to claim 1 wherein said polymer is cationic.

13. A method according to claim 1 wherein said polymer is non-ionic.

14. A method according to claim 1 wherein said polymer is a copolymer of acrylamide and acrylic acid.

15. A method according to claim 1 wherein said polymer is a copolymer of acrylamide and dimethyl-aminoethyl methacrylate.

16. A free-flowing, particle, mixture of a water-soluble vinyl-addition polymer, (1) the particles thereof having a size no smaller than about 325 mesh, (2) at least 50% thereof having a size larger than at least about 120 mesh and (3) none thereof having a size larger about 20 mesh, said mixture containing no more than about 12% of total volatiles, said particles being highly porous, hollow and having at least one opening in their walls, said walls, said walls being composed of small, adhering aggregates of the same polymer composition.

17. A mixture according to claim 16 wherein the molecular weight of said polymer is at least 1,000,000.

18. A mixture according to claim 16 wherein said polymer is a polymer of acrylamide.

19. A mixture according to claim 16 wherein said polymer is polyacrylamide.

20. A mixture according to claim 16 wherein said volatiles are water and a hydrocarbon oil.

21. A mixture according to claim 16 wherein said polymer is anionic.

22. A mixture according to claim 16 wherein said polymer is cationic.

23. A mixture according to claim 16 wherein said polymer is non-ionic.

24. A mixture according to claim 16 wherein said polymer is a copolymer of acrylamide and acrylic acid.

25. A mixture according to claim 16 wherein said polymer is a copolymer of acrylamide and dimethyl aminoethyl methacrylate.

* * * * *